United States Patent
Zhi et al.

(10) Patent No.: US 9,615,302 B2
(45) Date of Patent: Apr. 4, 2017

(54) SWITCHING METHOD FOR VISIBLE-LIGHT COMMUNICATION DEVICE AND TERMINAL DEVICE AT ACCESS POINT

(71) Applicant: ZTE CORPORATION, Shenzhen, Guangdong Province (CN)

(72) Inventors: Zhou Zhi, Shenzhen (CN); Xiaoguang Tian, Shenzhen (CN); Lin Chen, Shenzhen (CN); Zhong Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 55 days.

(21) Appl. No.: 14/763,813

(22) PCT Filed: Aug. 13, 2013

(86) PCT No.: PCT/CN2013/081333
§ 371 (c)(1),
(2) Date: Jul. 27, 2015

(87) PCT Pub. No.: WO2014/117498
PCT Pub. Date: Aug. 7, 2014

(65) Prior Publication Data
US 2015/0373610 A1    Dec. 24, 2015

(30) Foreign Application Priority Data

Jan. 29, 2013   (CN) .......................... 2013 1 0033629

(51) Int. Cl.
*H04B 17/00* (2015.01)
*H04W 36/30* (2009.01)
(Continued)

(52) U.S. Cl.
CPC .......... *H04W 36/30* (2013.01); *H04B 10/116* (2013.01); *H04W 36/0016* (2013.01); *H04W 36/0094* (2013.01); *H04W 36/08* (2013.01)

(58) Field of Classification Search
CPC ............. H04W 36/30; H04W 36/0094; H04W 36/0016; H04W 36/08; H04B 10/116
(Continued)

(56) References Cited

U.S. PATENT DOCUMENTS 8,131,154 B2 * 3/2012 Murayama ......... H04B 10/1141
398/118
2009/0256062 A1   10/2009 Matsui
(Continued)

FOREIGN PATENT DOCUMENTS

CN         101814955 A     8/2010
CN         102217375 A    10/2011
(Continued)

*Primary Examiner* — Juan A Torres
(74) *Attorney, Agent, or Firm* — Ling Wu; Stephen Yang; Ling and Yang Intellectual Property (57) ABSTRACT

A switching method and device for a visible-light communication device and a terminal device at an access point, comprising: configuring different identification codes for visible-light communication devices; when a terminal device satisfies a switching condition, its original access point selecting a visible-light communication device whose signal quality is higher than that of the original access point as a target access point according to a peripheral access list, sending its capability to the target access point, and initiating a switching request; the original access point selecting an operating mode according to an indication of the target access point to notify the terminal device, and forwarding response fed back by the terminal device to the target access point; and when receiving response for the switching request fed back by the target access point and downlink resource allocation information, the original access point sending a switching command to the terminal device to switch.

20 Claims, 3 Drawing Sheets

(51) Int. Cl.
*H04B 10/116* (2013.01)
*H04W 36/00* (2009.01)
*H04W 36/08* (2009.01)

(58) Field of Classification Search
USPC .......................................................... 398/25
See application file for complete search history.

(56) References Cited

U.S. PATENT DOCUMENTS

| | | | |
|---|---|---|---|
| 2009/0310971 A1* | 12/2009 | Kim .................... | H04B 10/1149 398/103 |
| 2011/0069971 A1 | 3/2011 | Kim et al. | |
| 2011/0105134 A1* | 5/2011 | Kim ..................... | H04B 10/116 455/450 |
| 2011/0153201 A1* | 6/2011 | Park ....................... | G01C 21/20 701/533 |
| 2012/0008959 A1 | 1/2012 | Son et al. | |
| 2013/0026224 A1* | 1/2013 | Ganick ..................... | G01S 1/70 235/375 |
| 2013/0026945 A1* | 1/2013 | Ganick ..................... | G01S 1/70 315/246 |
| 2013/0028609 A1* | 1/2013 | Staats ....................... | G01S 5/16 398/130 |

FOREIGN PATENT DOCUMENTS

| | | |
|---|---|---|
| EP | 2328376 A1 | 6/2011 |
| WO | 2010057127 A1 | 5/2010 |

\* cited by examiner

SWITCHING METHOD FOR VISIBLE-LIGHT COMMUNICATION DEVICE AND TERMINAL DEVICE AT ACCESS POINT

TECHNICAL FIELD

The present document relates to the visible-light communication technology, and in particular, to a scheme which ensures a service continuity of a mobile terminal during switching at an access point.

BACKGROUND OF THE RELATED ART

The Visible Light Communications (VLC) is a kind of wireless communication technology, which uses the visible light of which the frequency is between 400 THz (the wavelength is 780 nm) and 750 THz (the wavelength is 400 nm) as a communication medium to complete information transmission.

The Visible Light Communication is a wireless access technology, which uses Light Emitting Diode (LED) visible light signals to transmit data. The most important characteristic of the Visible Light Communication is that it combines a LED illumination technology with the name of "green illumination" and provides high speed data transmission without electromagnetism interferences during the illumination, which solves problems of a narrow frequency band and the electromagnetism interferences in a broadband wireless system.

Figure 1:
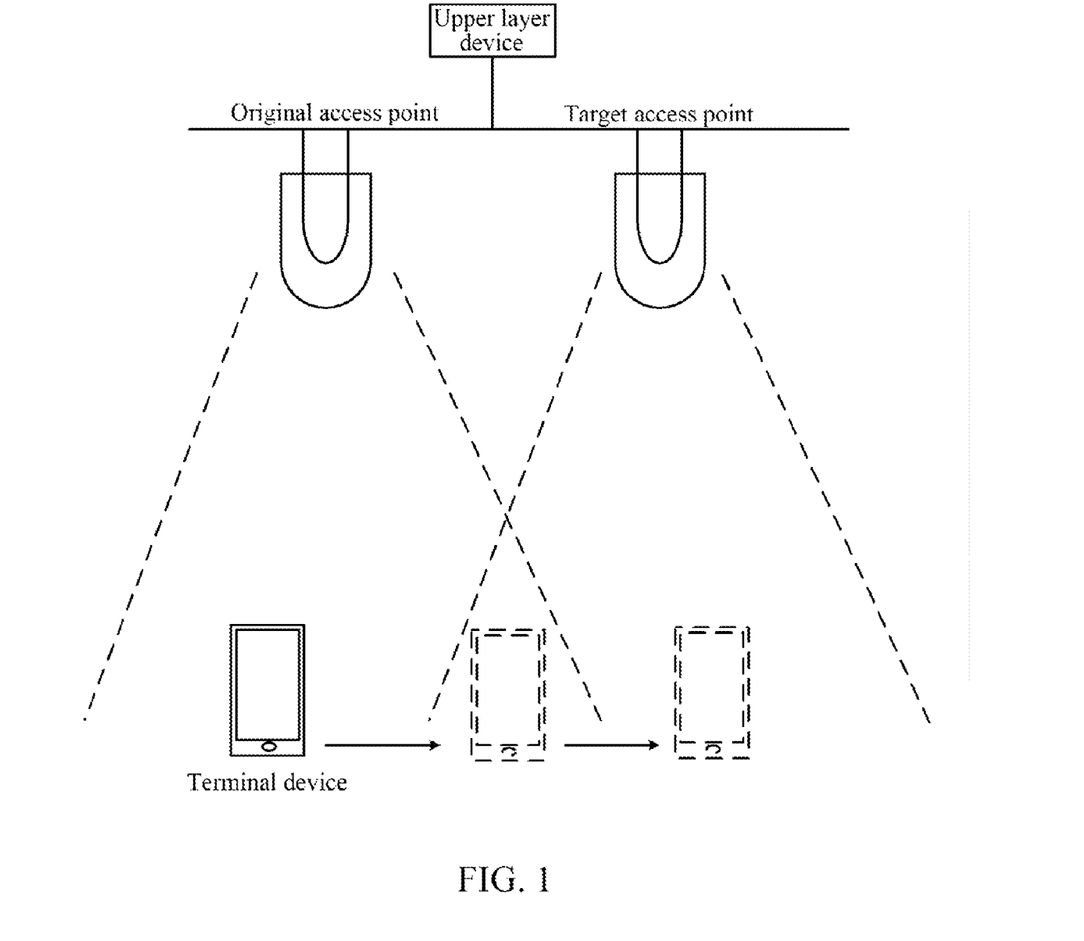
FIG. 1 is a schematic diagram of coverage blind areas of two access points in Visible Light Communications.

Although the Visible Light Communications has the above advantages, the linear characteristic of the visible light transmission is easy to form a coverage blind area. As shown in FIG. 1, a terminal device enters an area of a target access point from an original access point, and it may cause an access service of the terminal device to be interrupted at that moment. By providing the access switching flow of the Visible Light Communications for the terminal device, the continuous access service can be provided for the terminal device to improve user experience.

SUMMARY

The embodiment of the present provides an access switching method for visible-light communications, to improve the stability of a switching process and the continuity of a service.

The embodiment of the present document discloses a switching method for a visible-light communication device at an access point, comprising:

when a terminal device satisfies a switching condition, an original access point of the terminal device selecting a visible-light communication device of which signal quality is higher than that of the original access point as a target access point according to an identification code and signal quality of each visible-light communication device in a peripheral access list of the terminal equipment, sending a capability of the terminal device to the target access point, and initiating a switching request to the target access point;

the original access point selecting an operating mode according to an indication of the target access point, and notifying the selected operating mode to the terminal device, and forwarding response information fed back by the terminal device to the target access point; and after receiving the response information for the switching request fed back by the target access point and downlink resource allocation information, the original access point sending a switching command to the terminal device to perform switching.

Preferably, in the above method, determining that the terminal device satisfies the switching condition comprises:

if visible light signal quality in a measurement report reported by the terminal device and received by the original access point is lower than a threshold value, the original access point determining that the terminal device satisfies the switching condition; or if the terminal device judges that visible light signal quality of the original access point is lower than a threshold value when performing a measurement, the terminal device determining that the local terminal device satisfies the switching condition, and initiating a switching request to the original access point.

Preferably, the above method further comprises:

the original access point sending a measurement control request to the terminal device;

the terminal device reporting measurement parameters according to the measurement control request, wherein, the reported measurement parameters comprise an identification code and signal quality of a visible-light communication device of which a signal can be received by the terminal device.

Preferably, the above method further comprises:

when selecting a target access point, the original access point selecting a visible-light communication device of which signal quality is higher than that of the original access point and a difference between the signal quality of the selected visible-light communication device and the signal quality of the original access point is greater than a preset threshold value as the target access point.

Preferably, in the above method, sending a capability of the terminal device to the target access point comprises:

the original access point sending the capability of the terminal device to the target access point through a wired interface with the target access point; or the original access point sending the capability of the terminal device to the target access point through an upper layer device.

Preferably, in the above method, notifying the selected operating mode to the terminal device comprises:

the original access point notifying the selected operating mode to the terminal device through a separate process; or the original access point notifying the selected operating mode to the terminal device through a downlink allocation process.

The embodiment of the present document further provides a visible-light communication device, comprising:

a first module, configured to: when determining that a terminal device accessed under an original access point satisfies a switching condition, select a visible-light communication device of which signal quality is higher than that of the original access point as a target access point according to an identification code and signal quality of each visible-light communication device in a peripheral access list of the terminal device;

a second module, configured to: send a capability of the terminal device to the target access point, and initiate a switching request to the target access point;

a third module, configured to: select an operating mode according to an indication of the target access point, and notify the selected operating mode to the terminal device, and forward response information fed back by the terminal device to the target access point; and a fourth module, configured to: after receiving response information for a switching request fed back by the target access point and downlink resource allocation information, send a switching command to the terminal device to perform switching.

Preferably, in the above device, the first module is configured to: when visible light signal quality in a measurement report reported by the terminal device and received by the original access point is lower than a threshold value, determine that the terminal device satisfies the switching condition; or when the switching request initiated by the terminal device has received, determine that the terminal device satisfies the switching condition.

Preferably, the above device further comprises:

a fifth module, configured to: send a measurement control request to the terminal device; wherein, the measurement control request indicates measurement parameters reported by the terminal device, wherein the measurement parameters comprises an identification code and signal quality of the visible-light communication device of which a signal can be received by the terminal device.

Preferably, in the above device, the first module is configured to select the target access point by means of: selecting a visible-light communication device of which signal quality is higher than that of the original access point and a difference between the signal quality of the selected visible-light communication device and the signal quality of the original access point is greater than a preset threshold value as the target access point.

Preferably, in the above device, the second module is configured to send a capability of the terminal device to the target access point by means of: sending the capability of the terminal device to the target access point through a wired interface with the target access point; or sending the capability of the terminal device to the target access point through an upper layer device.

Preferably, in the above device, the third module is configured to notify the selected operating mode to the terminal device by means of: notifying the selected operating mode to the terminal device through a separate process; or notifying the selected operating mode to the terminal device through a downlink allocation process.

The embodiment of the present document ensures the reliability and efficiency of the access switching through the negotiation between the terminal device and the target access point, and maintains certain acceptable service quality.

PREFERRED EMBODIMENTS OF THE PRESENT DOCUMENT

The preferable embodiment of the present document is described in detail with reference to the accompanying drawings hereinafter. It should be illustrated that, in the case of not conflicting, the embodiments in the present application and features in these embodiments can be combined with each other.

Embodiment 1

The inventor considers that the switching operation relates to measurements in the Visible Light Communications and various identification codes can set for different visible-light communication devices respectively, in this way, a terminal device can distinguish the intensities and other access information of different access points through identification codes. Based on this, the present embodiment provides a method for access switching of Visible Light Communications. In a switching process, a current Visible Light Communications access point of the terminal device is called an original access point, and the access point to be accessed is called a target access point. In the switching process, an upper layer device on the original access point and the target access point can also be involved, which can be a gateway or other devices. The terminal device accesses to the target access point through the processes, such as, measurement, notification, initiating the switching signaling, etc., and the target access point prepares to receive the terminal device request and perform the access switching.

Based on the above-mentioned concept, the embodiment provides a switching method for a visible light communication terminal device at an access point, including following steps.

When a certain terminal device satisfies a switching condition, an original access point of the terminal device selects a visible-light communication device of which signal quality is higher than that of the original access point as a target access point according to an identification code and signal quality of each visible-light communication device in a peripheral access list of the terminal device, sends a capability of the terminal device to the target access point, and initiates a switching request to the target access point;

the original access point selects an operating mode according to an indication of the target access point, and notifies the terminal device, and forwards response information fed back by the terminal device to the target access point; and when receiving the response information for the switching request fed back by the target access point and downlink resource allocation information, the original access point sends a switching command to the terminal device to perform switching.

While the mode of determining that a certain terminal device satisfies the switching condition includes two kinds as following.

Firstly, when visible light signal quality in a measurement report reported by the terminal device and received by the original access point is lower than a threshold value, the original access point determines that the terminal device satisfies the switching condition;

Secondly, the terminal device judges that the visible light signal quality of the original access point is lower than the threshold value when performing a measurement, then it is determined that the present terminal device satisfies the switching condition, and the switching request can be initiated to the original access point.

In addition, the original access point can further send a measurement control request to the terminal device; in this way, the terminal device reports all identification codes and signal quality of various visible-light communication devices which can be received by the terminal device to the original access point when reporting the measurement parameters according to the measurement control request. While selecting the target access point, the signal quality of each visible-light communication device reported by the terminal device can be referred.

It further should be especially pointed out that, considering that frequent switching will cause a waste of system resources, therefore the preferable scheme puts forward that when selecting the target access point, the original access point requires to select a visible-light communication device of which signal quality is higher than that of the original access point and a difference between the signal quality of the selected visible-light communication device and the signal quality of the original access point is greater than a preset range as the target access point. That is to say, only when the signal of the original access point gets worse and the signal intensity of the access point around the terminal device is strong enough, the switching from the original access point to the target access point is occurred.

Figure 2:
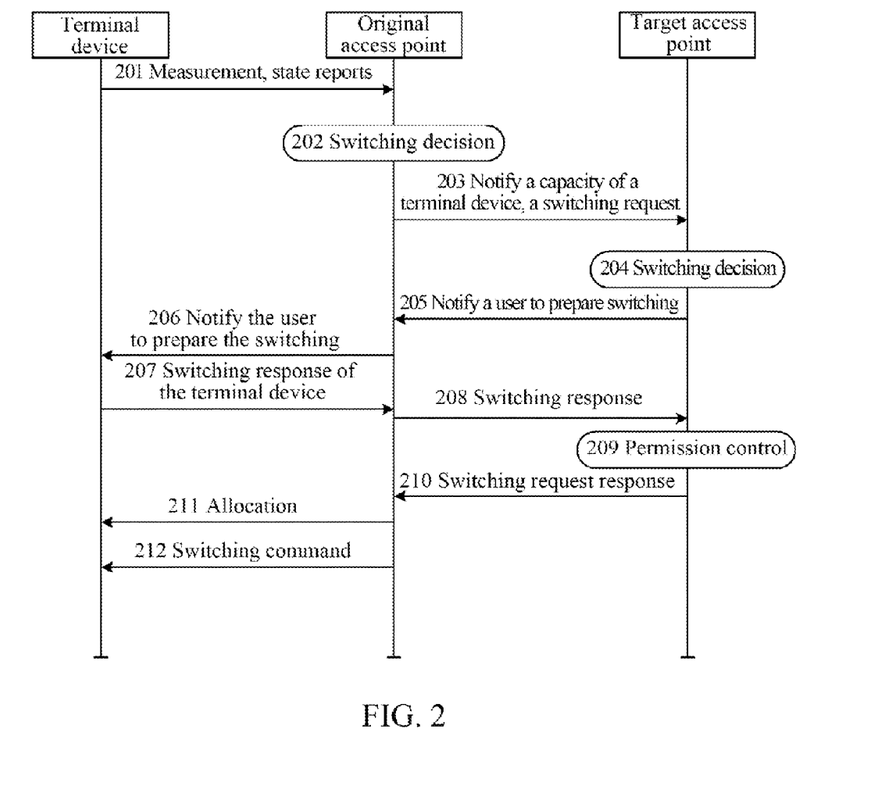
FIG. 2 is a flow chart of access switching of Visible Light Communications according to the embodiment.

The process for the Visible Light Communication terminal device switching the access points is illustrated below by combining with FIG. 2. The process includes following steps 201 to 212.

In step 201, the terminal device performs a measurement and reports to an original access point.

In step 202, when the visible light signal quality reported by the terminal device lower than a certain threshold value, then the original access point makes a decision of switching and selects the target access point according to the peripheral access list.

In step 203, the original access point notifies a capability of the above-mentioned terminal device to the target access point and sends a switching request to the target access point.

In that step, the original access point notifies the target access point through a wired interface with the target access point, or notifies various information to the target access point through an upper layer device of the original access point (the upper layer device is probably a management gateway).

In step 204, the target access point makes a decision.

In step 205, the target access point notifies the selected operating mode to the original access point.

In that step, the target access point notifies the original access point through the wired interface of the target access point; or notifies the original access point through the upper layer management gateway of the target access point.

In step 206, the original access point notifies the selected operating mode to the target access point of the terminal device.

In that step, the original access point notifies the selected operating mode to the terminal device through a separate process, and prepares the switching; or includes a notification of the selected operating mode in a downlink allocation process.

In step 207, the terminal device sends a response signal.

In step 208, the original access point forwards the response signal to the target access point.

In step 209, the target access point makes permission control, so that the terminal device to be switched accesses to the target access point.

In step 210, the target access point sends the response signal of the switching request to the original access point.

In step 211, the downlink resource allocation information is transferred.

In step 212, the original access point sends a switching command to the terminal device.

In the above-mentioned flow, before performing the step 201, it further can include the following operations.

(A) the original access point sends a request for measurement control to the terminal device.

(B) the terminal device reports measurement parameters, and the measurement parameters comprise signal quality of various adjacent access points which can be received by the terminal device.

In addition, except the above flow, the terminal device can select any of the following access method before accessing to a new device.

The terminal device disconnects with the original access point and accesses to a new access point.

The terminal device keeps a normal connection with the original access point, and disconnects the connection with the original access point after a connection with the new access point gets normal.

Figure 3:
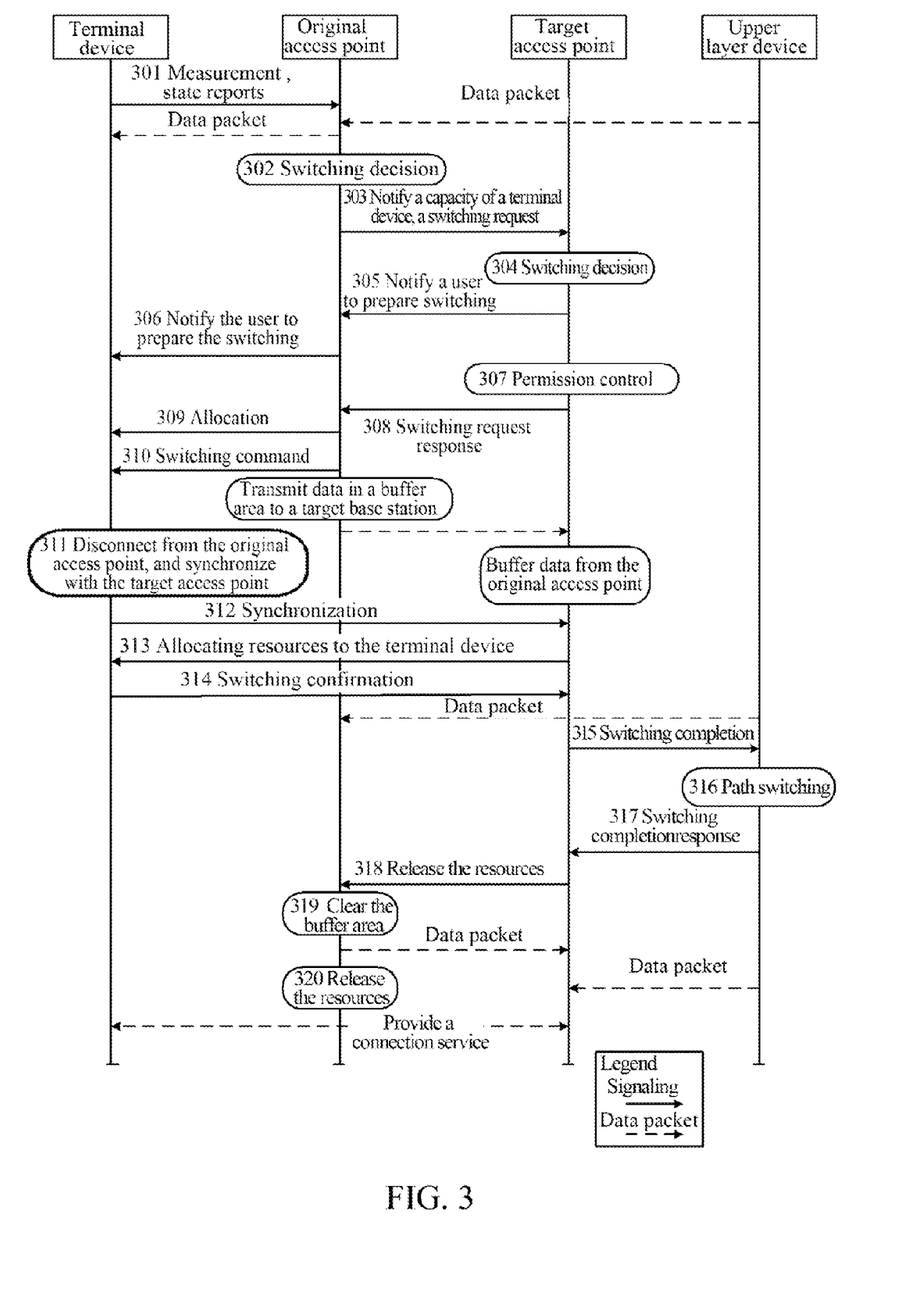
FIG. 3 is a flow chart of access switching of Visible Light Communications according to the preferable embodiment.

An application example is illustrated below by combining with FIG. 3, which is a key flow including the switching of the terminal device, that is, a process that a user equipment leaves an original access point and accesses to a target access point. The process includes following steps 301 to 320.

In step 301, the access point sends the measurement control request to the user equipment.

In step 302, the original access point makes a switching decision.

In step 303, the original access point reports a capability of the terminal device and a switching request to the target access point.

The original access point notifies the multi-antenna operating mode set of the user equipment to the target access point through a wired interface, which includes two possible modes here.

a. the original access point notifies the target access point through the wired interface with the target access point.

b. the target access point is notified through an upper layer device at the access point.

In step 304, the target access point makes a switching decision.

In step 305, the target access point notifies the original access point to prepare the switching.

In step 306, the original access point notifies the terminal device to prepare the switching.

In step 307, the target access point performs permission control, so that the user equipment to be switched accesses to the target access point.

In step 308, the target access point sends a switching response to the original access point.

In step 309, the original access point sends downlink resource allocation information to the user equipment.

In step 310, the original access point sends a switching command to the user equipment.

In step 311, after preparation work of a new link is completed, the user equipment disconnects from the original access point.

In step 312, the user device sends a synchronization request to the target access point.

In step 313, the target access point sends resource allocation information to the user equipment.

In step 314, the user device sends switching confirmation information to the target access point.

In step 315, the target access point sends a switching completion command to the upper layer device.

In step 316, the upper layer device performs the path switching.

In step 317, the upper layer device sends a switching completion response signal to the target access point.

In step 318, the target access point sends a resource releasing command to the original access point.

In step 319, the original access point clears downlink buffer data, and continues transmitting the data.

In step 320, the original access point releases all resources of the user equipment.

The user equipment completely accesses to the target access point, and starts providing a connection service.

Embodiment 2

The present embodiment provides a visible-light communication device, which can realize the method of the above embodiment 1, and the device includes various modules as following.

a first module is configured to: when a certain terminal device accessed under the device satisfies a switching condition, select a visible-light communication device of which a signal quality is higher than that of the original access point as a target access point according to an identification code and a signal quality of each visible-light communication device in a peripheral access list of the terminal device.

It should be explained that the first module is configured to: when visible light signal quality in a measurement report reported by the terminal device and received by the device is lower than a threshold value, determine that the terminal device satisfies the switching condition; or when a switching request initiated by the terminal device has been received, determine that the terminal device satisfies the switching condition.

Preferably, when selecting the target access point, except requesting the signal quality to be stronger than the original access point, the first module further requests that a difference between its signal quality and the signal quality of the original access point is larger than the preset threshold value, so as to avoid the frequent switching of the terminal to cause a waste of system resources.

a second module is configured to: send a capability of the terminal device to the target access point, and initiate a switching request to the target access point.

Preferably, the second module can send a capability of the terminal device to the target access point through a wired interface with the target access point, or through an upper layer device.

a third module is configured to: select an operating mode according to an indication of the target access point, and notify the terminal device, and forward response information fed back by the terminal device to the target access point.

Preferably, the third module can notify the selected operating mode to the terminal device by using a separate process, or through a downlink allocation process.

a fourth module is configured to: after receiving response information for a switching request fed back by the target access point and downlink resource allocation information, send a switching command to the terminal device to perform switching.

Some preferable schemes also put forward that the above device can include a fifth module, configured to: send a measurement control request to the terminal device; wherein, the measurement control request indicates measurement parameters reported by the terminal device, including identification codes and signal quality of various visible-light communication devices, which can be received by the terminal device, so as to be easy for the first module to select the target access point.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only the preferred embodiments of the present document and is not intended to limit the protection scope of the present document. All of modifications, equivalents and/or variations without departing from the spirit and essence of the present document should be embodied in the scope of the appending claims of the present document.

INDUSTRIAL APPLICABILITY

The embodiment of the present document ensures the reliability and efficiency of the access switching through the negotiation between the terminal device and the target access point, and maintains a certain acceptable service quality.

What we claim is:

1. A switching method for a visible-light communication terminal device at an access point, comprising:
   when a terminal device satisfies a switching condition, an original access point of the terminal device selecting a visible-light communication device of which signal quality is higher than that of the original access point as a target access point according to an identification code and signal quality of each visible-light communication device in a peripheral access list of the terminal device, sending a capability of the terminal device to the target access point, and initiating a switching request to the target access point;
   the original access point selecting an operating mode according to an indication of the target access point, and notifying the selected operating mode to the terminal device, and forwarding response information fed back by the terminal device to the target access point; and
   after receiving response information for the switching request fed back by the target access point and downlink resource allocation information, the original access point sending a switching command to the terminal device to perform switching.

2. The method according to claim 1, wherein, determining that a terminal device satisfies a switching condition comprises:
   if visible light signal quality in a measurement report reported by the terminal device and received by the original access point is lower than a threshold value, the original access point determining that the terminal device satisfies the switching condition; or
   if the terminal device judges that visible light signal quality of the original access point is lower than a threshold value when performing a measurement, the terminal device determining that the local terminal device satisfies the switching condition, and initiating a switching request to the original access point.

3. The method according to claim 1, further comprising:
   the original access point sending a measurement control request to the terminal device;
   the terminal device reporting measurement parameters according to the measurement control request, wherein, the reported measurement parameters comprise an identification code and signal quality of a visible-light communication device of which a signal can be received by the terminal device.

4. The method according to claim 3, further comprising: when selecting a target access point, the original access point selecting a visible-light communication device of which signal quality is higher than that of the original access point and a difference between the signal quality of the selected visible-light communication device and the signal quality of the original access point is greater than a preset threshold value as the target access point.

5. The method according to claim 3, wherein, sending a capability of the terminal device to the target access point comprises:
the original access point sending the capability of the terminal device to the target access point through a wired interface with the target access point; or
the original access point sending the capability of the terminal device to the target access point through an upper layer device.

6. The method according to claim 3, wherein, notifying the selected operating mode to the terminal device comprises:
the original access point notifying the selected operating mode to the terminal device through a separate process; or
the original access point notifying the selected operating mode to the terminal device through a downlink allocation process.

7. A visible-light communication device, comprising:
a first module, configured to: when determining that a terminal device accessed under an original access point satisfies a switching condition, select a visible-light communication device of which signal quality is higher than that of the original access point as a target access point according to an identification code and signal quality of each visible-light communication device in a peripheral access list of the terminal device;
a second module, configured to: send a capability of the terminal device to the target access point, and initiate a switching request to the target access point;
a third module, configured to: select an operating mode according to an indication of the target access point, and notify the selected operating mode to the terminal device, and forward response information fed back by the terminal device to the target access point; and
a fourth module, configured to: after receiving response information for the switching request fed back by the target access point and downlink resource allocation information, send a switching command to the terminal device to perform switching.

8. The device according to claim 7, wherein,
the first module is configured to: when visible light signal quality in a measurement report reported by the terminal device and received by the original access point is lower than a threshold value, determine that the terminal device satisfies the switching condition; or when receiving the switching request initiated by the terminal device, determine that the terminal device satisfies the switching condition.

9. The device according to claim 7, further comprising:
a fifth module, configured to: send a measurement control request to the terminal device; wherein, the measurement control request indicates measurement parameters reported by the terminal device, which comprise an identification code and signal quality of the visible-light communication device of which a signal can be received by the terminal device.

10. The device according to claim 9, wherein,
the first module is configured to select the target access point by means of: selecting a visible-light communication device of which signal quality is higher than that of the original access point and a difference between the signal quality of the selected visible-light communication device and the signal quality of the original access point is greater than a preset threshold value as the target access point.

11. The device according to claim 9, wherein,
the second module is configured to send a capability of the terminal device to the target access point by means of: sending the capability of the terminal device to the target access point through a wired interface with the target access point; or sending the capability of the terminal device to the target access point through an upper layer device.

12. The device according to claim 9, wherein,
the third module is configured to notify the selected operating mode to the terminal device by means of: notifying the selected operating mode to the terminal device through a separate process; or notifying the selected operating mode to the terminal device through a downlink allocation process.

13. The method according to claim 2, further comprising:
the original access point sending a measurement control request to the terminal device;
the terminal device reporting measurement parameters according to the measurement control request, wherein, the reported measurement parameters comprise an identification code and signal quality of a visible-light communication device of which a signal can be received by the terminal device.

14. The method according to claim 13, further comprising:
when selecting a target access point, the original access point selecting a visible-light communication device of which signal quality is higher than that of the original access point and a difference between the signal quality of the selected visible-light communication device and the signal quality of the original access point is greater than a preset threshold value as the target access point.

15. The method according to claim 13, wherein, sending a capability of the terminal device to the target access point comprises:
the original access point sending the capability of the terminal device to the target access point through a wired interface with the target access point; or
the original access point sending the capability of the terminal device to the target access point through an upper layer device.

16. The method according to claim 13, wherein, notifying the selected operating mode to the terminal device comprises:
the original access point notifying the selected operating mode to the terminal device through a separate process; or
the original access point notifying the selected operating mode to the terminal device through a downlink allocation process.

17. The device according to claim 8, further comprising:
a fifth module, configured to: send a measurement control request to the terminal device; wherein, the measurement control request indicates measurement parameters reported by the terminal device, which comprise an identification code and signal quality of the visible-light communication device of which a signal can be received by the terminal device.

18. The device according to claim 17, wherein,
the first module is configured to select the target access point by means of: selecting a visible-light communication device of which signal quality is higher than that of the original access point and a difference between the signal quality of the selected visible-light communication device and the signal quality of the original access point is greater than a preset threshold value as the target access point.

19. The device according to claim 17, wherein,
the second module is configured to send a capability of the terminal device to the target access point by means of: sending the capability of the terminal device to the target access point through a wired interface with the target access point; or sending the capability of the terminal device to the target access point through an upper layer device.

20. The device according to claim 17, wherein,
the third module is configured to notify the selected operating mode to the terminal device by means of: notifying the selected operating mode to the terminal device through a separate process; or notifying the selected operating mode to the terminal device through a downlink allocation process.

* * * * *